April 1, 1930.  C. H. LOGUE  1,753,014
GEAR TESTING MACHINE
Filed Aug. 22, 1928   3 Sheets-Sheet 1
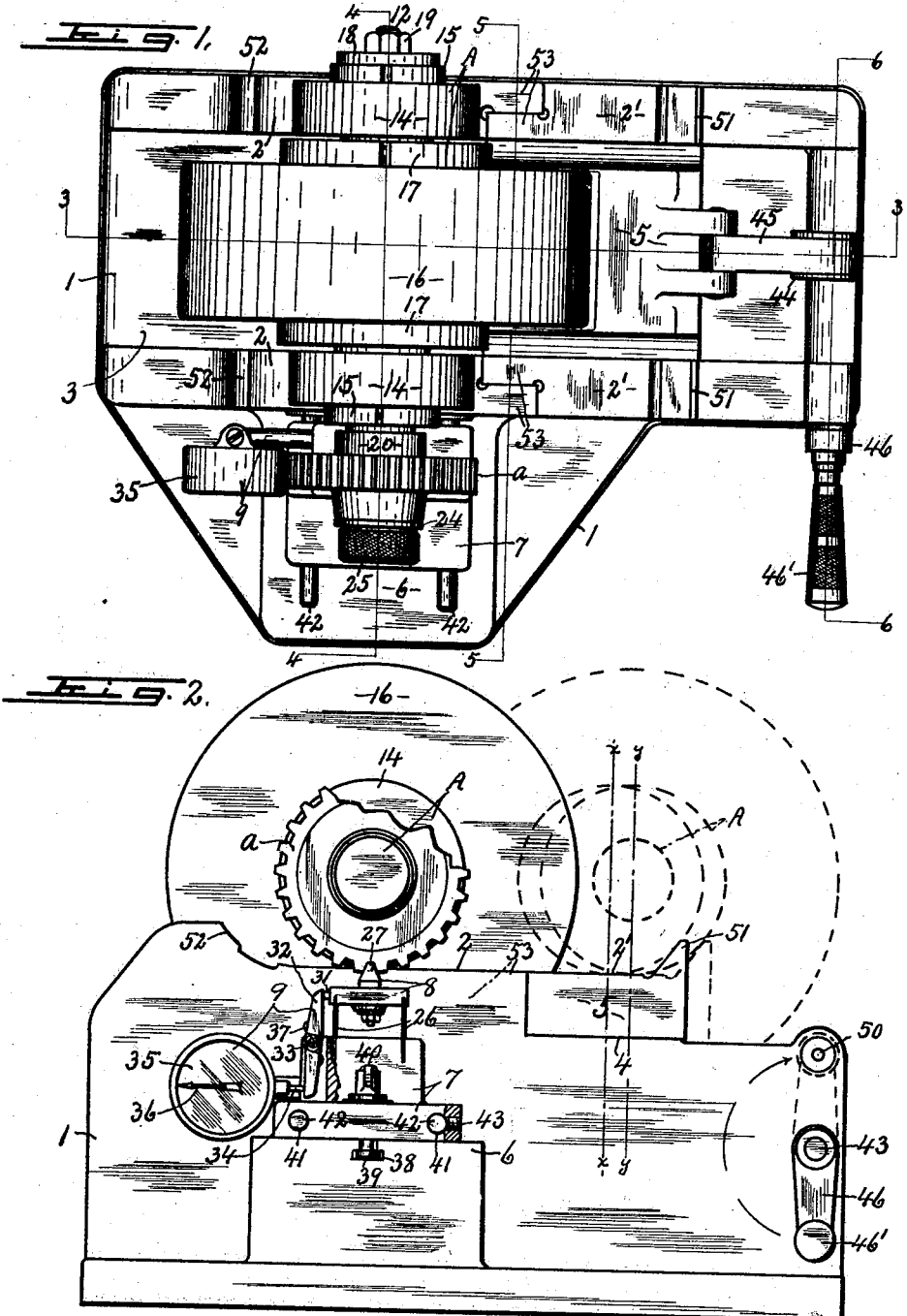

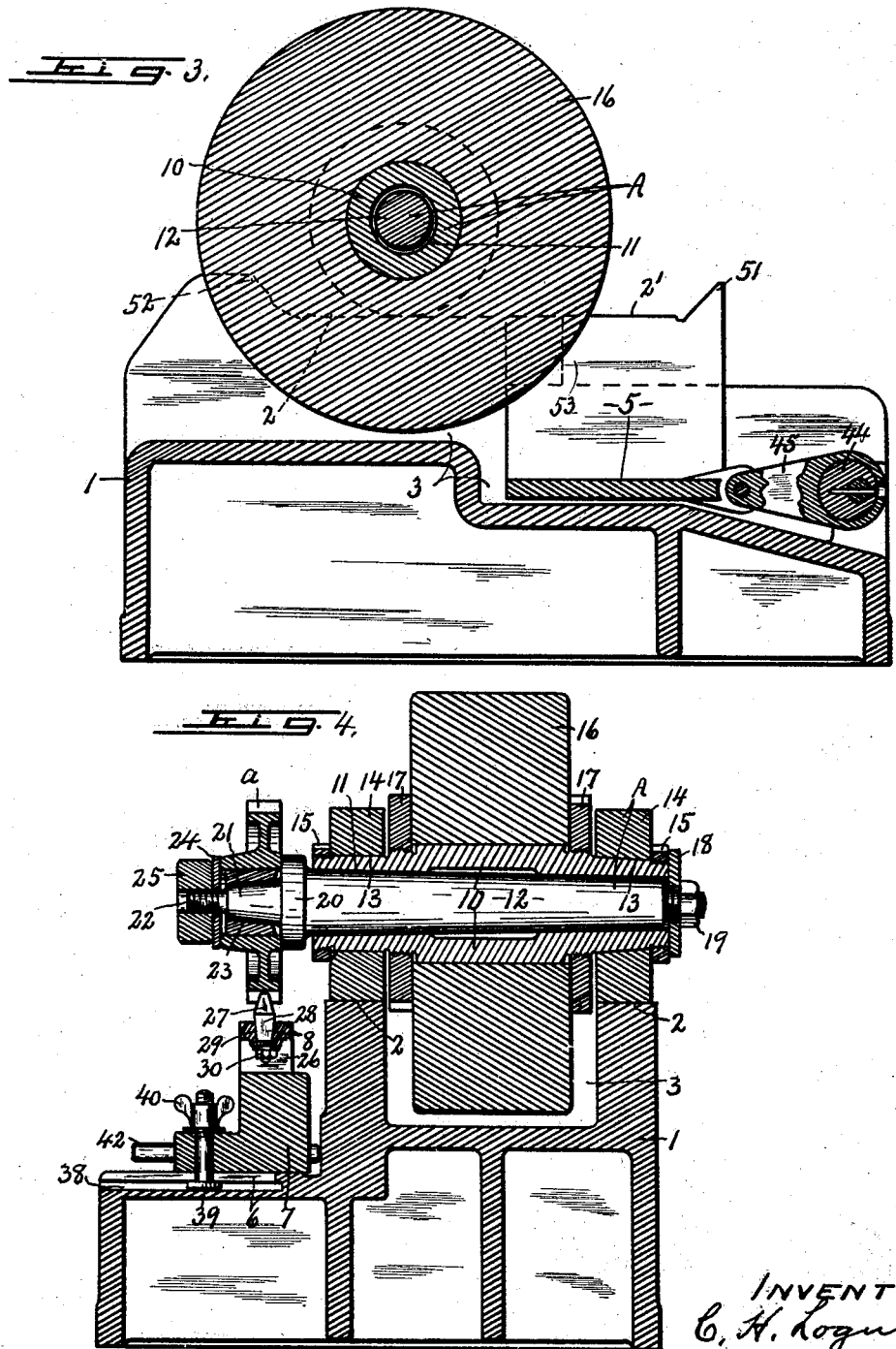

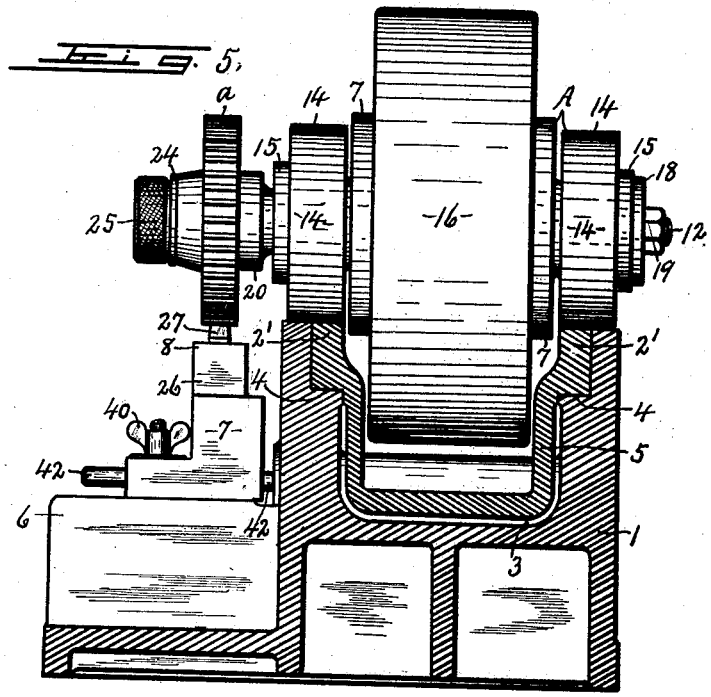
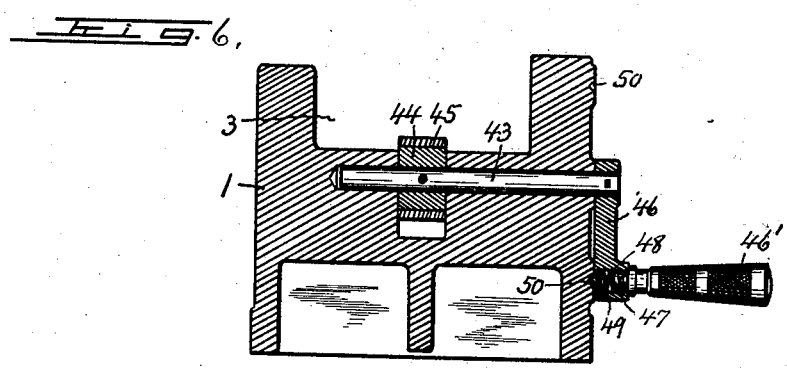

Patented Apr. 1, 1930

1,753,014

UNITED STATES PATENT OFFICE

CHARLES H. LOGUE, OF SYRACUSE, NEW YORK, ASSIGNOR OF ONE-HALF TO CONRAD O. HERSAM, OF PHILADELPHIA, PENNSYLVANIA

GEAR-TESTING MACHINE

Application filed August 22, 1928. Serial No. 301,300.

This invention relates to a machine for testing or checking the accuracy and inaccuracies in the spacings and surface contours of the teeth of gears and while it is shown as applied to the testing of the teeth of spur gears it is equally useful in checking the accuracies or inaccuracies of worm, helical or herringbone gears, beveled gears either straight or spiral toothed, skew teeth, hypoid and other gears.

The main object is to provided a simple, compact and economical machine of this character which may be successfully used by the less experienced operators and is more efficient and accurate in its testing operations than has heretofore been practised.

In other words, I have sought to simplify the testing of the accuracies or inaccuracies of the teeth of the gear by the simple operation of rolling the gear along a plane tangential to its pitch or base circle with one or more teeth of the gear in running mesh with one or more relatively fixed master teeth of selected obliquity corresponding to that required for the perfect operation of the teeth of the gear under test.

Another object is to enable the spacing of the teeth to be checked or tested independently of the testing of the profiles or contours of the teeth and vice versa and also in combination one with the other and thereby to avoid confusion as to whether or not the error, if any, is due to the imperfect spacing or to the imperfect profile or curvature of the teeth since any inaccuracies in the profiles of the teeth may effect the spacing tests as ordinarily made.

Other objects and uses relating to specific parts of my invention will be brought out in the following description.

In the drawings:

Figures 1 and 2 are respectively a top plan and a front elevation of a gear testing machine embodying the various features of my invention, portions of the machine being shown in section in Figure 2.

Figures 3, 4, 5 and 6 are sectional views taken respectively on lines 3—3, 4—4, 5—5 and 6—6, Figure 1.

As illustrated, this machine comprises a main supporting frame or bed —1— having a pair of parallel track surfaces —2— of predetermined length disposed in the same horizontal plane and in transversely spaced relation to form a stable support for the gear carrier A and also to form an intervening channel —3— for receiving a rotary portion of the carrier hereinafter more fully described.

The frame —1— is provided with horizontal guideways —4— at opposite sides of the channel —3— and in a plane below and parallel with the track surfaces —2— for receiving and supporting a sliding carriage —5— which is reciprocally movable along and upon the guideways —4— in a manner and for a purpose hereinafter described. The frame —1— is also provided with a forwardly projecting platform —6— intermediate its ends and having its upper face disposed in a horizontal plane some distance below but parallel with the track surfaces —2— and guideways —4— for receiving and supporting a slide block —7— which is adjustable transversely of and upon the platform —6— transversely of the frame —1— for receiving and supporting a toothed rack —8— and a measuring instrument —9— operatively connected to the toothed rack —8— for measuring any inaccuracies in the spacing or profile of the teeth of the gear under inspection as will be hereinafter more fully explained.

*Gear carrier*

The gear carrier comprises a hollow mandrel —10— having a rearwardly tapered coaxial bore —11— for receiving a correspondingly tapered gear supporting spindle —12— which is tightly fitted in the mandrel —10— to rotate therewith during the gear testing operation.

The mandrel —10— and its spindle —12— extend transversely of and at right angles to the track surfaces —2— and guideways —4—, the opposite ends of the mandrel —10— being tapered at —13— for receiving a pair of internally tapered rollers —14— which are tightly fitted upon the tapered portions —13— and are held in operative position by nuts —15— engaging the adjacent threaded ends of the mandrel —10— as shown more clearly in Figure 4.

A relatively heavy balance wheel —16— is mounted upon the intermediate portion of the mandrel —10— in axially spaced relation to and from the rollers —14— and is held in operative position on the mandrel against relatively endwise movement by clamping nuts —17— which are engaged with adjacent threaded portions of the mandrel and when tightened against the opposite end faces of the balance wheel —16— serve to lock the wheel to the mandrel so that both may rotate in unison, it being understood that the nuts —17— are located between the inner end faces of the rollers —14— and adjacent end faces of the balance wheel —16— with just sufficient clearance to permit the nuts —17— to be tightened and loosened against and from the adjacent ends of the balance wheel.

The rear smaller end of the tapered spindle —12— is reduced and threaded for receiving a washer —18— and a nut —19—, the washer —18— being engaged with the adjacent end faces of the mandrel —10— and nut —15— while the nut —19— is engaged with the rear end face of the washer and adjacent threaded extension of the spindle —12— for frictionally locking the spindle to and within the mandrel whereby both may rotate together.

The front end of the spindle —12— is extended forwardly some distance beyond the front end of the mandrel —10— and is provided with an annular flange —20—, a reduced forwardly tapered extension —21—, and a further reduced forwardly projecting threaded extension —22—, the flange —20— being located adjacent the front end of the mandrel —10— while the tapered portion —21— is located between the flange —20— and threaded portion —22—.

An internal tapered bushing —23— is tightly fitted upon the tapered extension —21— for receiving and supporting a gear as —a— to be tested or inspected to determine the accuracy or inaccuracy of its teeth, the hub of the gear —a— being tightly clamped upon the periphery of the bushing —23— and against the flange —20— by means of a washer —24— and a nut —25— which latter is engaged with the reduced threaded extension —22— on the front end of the spindle —12—, Figure 4.

The cylindrical rollers —14— are of the same pitch diameter corresponding to that of the gear —a— under test and are adapted to rest upon the track surfaces —2— so that when rolled by hand or otherwise along and upon said track surfaces corresponding rotary motion will be transmitted to the mandrel —10— and parts carried thereby including the spindle —12— and gear —a— thereon.

To facilitate this hand rotation of the mandrel and its spindle —12— together with the parts carried thereby the periphery of the front end nut —25— is preferably knurled to be engaged by the hand of the operator and rotated thereby effecting the rolling motion of the cylinders —14— along and upon the track surfaces —2—.

*Rack support*

The rack support comprises the block —7— which is mounted upon the lateral extension —6— of the frame —1— in a plane some distance below the track surfaces —2— and is provided with a pair of upwardly projecting flat springs —26— in spaced relation lengthwise of the machine and edgewise transversely thereof and carry at their upper ends the rack —8— to which is secured an upwardly projecting test tooth —27— of predetermined obliquity corresponding to that of the teeth of the gear to be tested.

This tooth —27— is arranged in the pitch circle of the gear —a— and, therefore, extends vertically across the plane of the track surfaces —2— and produced periphery of the cylinders —14— to mesh with one or more of the teeth of the gear —a— as the cylinders —14— are rolled along the track surfaces —2—, see Figure 2.

The springs —26— are relatively light and highly resilient but normally support the rack —8— in a horizontal plane parallel with the track surfaces —2— while the master tooth —27— carried by the rack —8— will be supported in a plane at right angles to the rack and also at right angles to the plane of the track surfaces —2—.

The master tooth —27— is provided with a tapered shank —28— engaged in a tapered socket —29— in the rack —8— and held in operative position by a nut —30— engaging the lower threaded end of the shank —28— and underside of the rack —8— thus permitting the use of different selected master teeth according to the obliquity of the teeth of the gear under test.

The master tooth —27— including its shank —28— and socket —29— are preferably rectangular in cross section so that if desired one set of opposite faces of the tooth may represent one degree of obliquity for a corresponding gear under test while the other set of opposite faces may be of a different obliquity for cooperation with a corresponding gear under test.

This resiliency of the springs —26— permit the rack —8— and its master tooth —27— to yield in the direction of movement of the carrier —A— along the track surfaces —2— in case of any inaccuracy in the spacing or contour of the teeth of the gear —a— under test and this movement is utilized in connection with a measuring instrument as —9— for determining the amount and exact location of the inaccuracy in the spacing of the teeth and also the amount and location of any inaccuracy in the contour of the teeth.

For this latter purpose one end of the rack —8— is provided with a pin —31— adapted to engage the upper end of an upright lever —32— which is pivoted intermediate its ends at —33— to the block —7—, Figure 2, and has its lower end in contact with a movable plunger —34— of a dial-indicating instrument —35— having a pointer —36— movable around its dial and adapted to be operated by any suitable connections between the plunged —34— and pointer in case the rack —8— and lever —32— should have shifted from their normal zero positions.

The opposite ends of the lever —32— may be yieldingly held against the pin —31— and plunger —34— respectively by a light coiled spring as —37— of considerably less force than the springs —26— while the plunger —34— may be yieldingly held against the adjacent end of the lever —32— by a spring inherent in the measuring instrument —35— commonly employed in instruments of this character and, therefore, unnecessary to further illustrate or describe.

The block —7— is adjustable across and upon the platform —6— which is provided with a T-shaped slot —38— for receiving the head of a clamping bolt —39—, the latter being passed upwardly through an aperture in the adjacent portion of a block and provided with a thumb nut —40— adapted to be tightened against the upper face of the block for holding the block in its adjusted position, the object of this adjustment being to place the master tooth —27— in proper testing relation to the teeth of the gear —a— under test.

The base of the block —7— is provided near its opposite ends with transverse apertures —41— for receiving a pair of stop pins —42— which are adjustable toward and from the adjacent side of the frame —1— for engagement therewith and are held in their adjusted positions by set screws —43—, Figure 2.

When testing the teeth of a gear, as —a—, the carrier —A— will be rolled along the track —2— until the axis of the gear is in a vertical plane of the axis of the master tooth —27— at which time the master gear will be adjusted on the spindle —12— to bring the face of one of its teeth against the corresponding face of the master tooth without in any way shifting the rack —8— from its normal position.

The gear —a— under test is then firmly clamped to the spindle —12— which, together with the rollers —14— and balance wheel —16—, have been previously clamped to the mandrel —10— whereupon the carrier —A— may be rolled slightly back and forth along the tracks —2— to test the accuracy of the contour of the toothed surface in engagement with the master tooth.

If during this rolling movement the rack —8— remains in its neutral position it indicates that the contour of the tooth surface is perfect.

On the other hand, if the rack —8— is moved even slightly from its normal position as indicated by the pointer —36—it shows that the particular tooth profile under test is inaccurate and also determines the position of the inaccuracy so that the inaccuracy may be speedily corrected by proper instruments. In like manner the profile of each tooth may be tested by properly indexing the gear under test relatively to the master tooth —27—.

*Gear indexing*

This indexing of the gear —a— may be carried out by simply rolling the carrier —A— from the track surfaces —2— upon the continuations —2'— of the track surfaces on the sliding block —5— and then moving the block with the carrier —A— thereon endwise a farther distance from the rack —9— corresponding to the distance between the centers of adjacent teeth on the pitched circle or on the circumference of the cylinders —14— as indicated by dotted lines in Figure 2.

The block —5— is then allowed to remain temporarily in its extended position while the carrier —A— is rolled back to its starting position thereby bringing the next succeeding tooth space of the gear —a— into exact registration with the master tooth —27— whereupon the rolling motion of the carrier is repeated to test the accuracy of the profile and also the accuracy of the spacing of the second tooth as previously described, it being understood that immediately following the return of the carrier —A— from the track surface —2'— onto the track surface —2— the block —5— will be returned to its normal position ready for a repetition of the indexing operation just previously described.

The amount of movement of the block —5— from its normal position to its extended position is accurately predetermined by the theoretically correct pitch of the teeth of the gear under test or in other words, by the distance between the centers of the adjacent teeth on the pitch circle of said gear so that if the teeth are properly spaced and the profiles thereof are perfect the return of the carriage —A— from the block —5— to its testing position on the track —2— after each indexing operation will be effected without any movement of the rack —8— but if the spacing of the teeth are incorrect the rack —8— will be moved from its normal position against the action of the retracting spring —27— and this movement will be indicated by the pointer —26— on the dial —35—.

It is, therefore, evident that the machine may be used for testing the accuracy of the spacing of the teeth separately from the operation of testing the accuracy of the profile or vice versa but it is also evident that both tests may be made in one and the same operation and if any inaccuracy occurs in either the spacing or contour of any one of the teeth it will be indicated by the pointer —36— thus permitting the inaccuracy to be speedily corrected exactly where it occurs.

Suitable means is provided for accurately adjusting and holding the block —5— to its different positions and for this purpose a cam shaft —43— is journaled in the frame —1— at the outer end of the block —5— and parallel with the axis of the mandrel —10— and is provided with an eccentric —44— connected by a pitman —45— to the lower portion of the adjacent end of the block —5— as shown more clearly in Figs. 1, 3 and 6.

The throw of the eccentric —44— is equal to the circular pitch of the gear —a— under test or, in other words, is equal to the distance between the centers of adjacent teeth on the pitch circle of the gear or on the circumference of the cylinders —14—.

It, therefore, follows that when the eccentric —44— is at its maximum inward throw the block —5— will be set and held in its normal starting position and that the turning of the eccentric one half revolution or 180 degrees in either direction will set and hold the block —5— in its outer extreme position for indexing purposes as previously described.

The front end of the cam shaft —43— extends beyond the front face of the frame —1— and is provided with a hand crank —46— by which the eccentric —44— may be turned from one extreme position to the other, said crank arm being provided with an operating handle —46'—, the inner end of which is screwed into a socket —47— in the crank arm —46—.

A coiled spring —48— is arranged in the socket —47— between the inner end of the handle —46— and a locking member —49— which is adapted to engage in recesses —50— in the adjacent face of the frame —1— to frictionally hold the crank arm —46—, shaft —43— and eccentric —44— together with the block —45— in both positions of adjustment, it being understood that one half turn of the crank arm —46— from the position shown by full lines to the position shown by dotted lines in Figure 2 will effect the adjustment of the block —5— from its normal position to its outermost position and that the continued or reverse movement of the crank arm —46— through another half revolution will return the block —5— from its outermost position to its normal position.

If desired, the outer end of the block —5— may be provided with upwardly projecting shoulder —51— in the path of rolling movement of the cylinders —14— to prevent displacement of the rollers from the block.

The outer end of the tracks —2— may also be provided with shoulders —52— projecting into the path of movement of the cylinders —14— to limit the movement of the carrier —A— in that direction.

In order that the track surfaces —2— and —2'— on the frame —1— and block —5— respectively may be continuous the adjacent end portions of the tracks —2— and —2'— are constructed to overlap upon each other laterally at —53— a distance somewhat greater than the amount of endwise adjustment of the block —5— leaving sufficient space between the overlapping portions —53— and stops —51— to allow the cylinders —14— to rest entirely upon the track surfaces —2'— when rolled against the stops —51— for indexing purposes, the portion of the block —5— connecting the track surfaces —2'— being depressed within the channel —3— on the frame —1— and engaged with the inner faces of the opposite lengthwise walls of the channel to hold the block against lateral displacement as shown more clearly in Figure 5.

*Operation*

Assuming that the gear —a— to be tested is properly secured to the spindle —12— and that the rack —8— and block —5— are properly set to their normal or zero position with the cylinders —14— resting upon the tracks —2—, as shown by full lines in the drawings, then by rolling the carrier —A— along and upon the tracks —2— in engagement with the master tooth —27— will determine the accuracy of profile of the particular tooth of the gear under test and if the rack —8— remains in its normal position as determined by the indicator —36— it follows that the tooth under test is perfect. If, however, there is any movement of the rack —8— in either direction the pointer —36— will indicate upon the dial —35— the amount of such movement and the exact location upon the tooth of the imperfection so that it may be speedily corrected in another machine made for that purpose.

After the test of the first tooth the carrier —A— will be rolled from the track —2— upon the track —2'— of the block —5— after which the block —5— will be moved in the manner previously described to the position shown by dotted lines in Figure 2 and temporarily locked in that position. The carrier —A— is then rolled back from the track —2'— of the block —5— on to the stationary track —2— with the assurance that the next succeeding tooth will, if properly spaced, register with the master tooth —27—.

If the next succeeding tooth of the gear —a— under test is not properly spaced the rack —8— will be moved in one direction or the other and this movement will be indicated upon the dial —35— so that the inspector may determine exactly the amount of the inaccuracy of the spacing and also the particular tooth which is inaccurately spaced so that the error may be readily corrected by the use of a special device for that purpose.

These operations may be repeated in testing the accuracy of spacing and also the accuracy of profile of each succeeding tooth of the gear —a—.

When all of the teeth of the same gear have been properly tested the gear may readily be removed from the spindle —12— and replaced by another gear to be tested, it being understood that if gears of different pitch are to be subjected to these tests the master tooth —27— may be replaced by another one having the proper obliquity corresponding to the obliquity of the teeth of the gear to be tested.

When necessary the rack supporting block —7— may be adjusted along the guide —38— to contact with different portions of the face of the teeth under test or in case the gear is reversed or a wider faced gear is under test.

The machine shown and described is particularly simple, compact and efficient in speedily testing the accuracy of spacing the profiles of the teeth of a gear but it is obvious that various changes may be made in the detailed construction and operation without departing from the spirit of this invention.

What I claim is:

1. The herein described method of testing the accuracy of gear teeth comprising rolling the gear in mesh with a master tooth and bringing it to rest out of engagement with the master tooth, then moving the gear bodily without rotating it in the direction of rolling motion a distance corresponding to the distance between the centers of adjacent gear teeth on the pitch circle of the gear, and then re-rolling the gear into mesh with the master gear along said pitch circle.

2. In a gear testing machine, a master tooth, means for rolling the gear under test into and out of mesh with the master tooth, means for bodily moving the gear at least one tooth space on the pitch circle in the direction of rolling motion but without rotating the same when not in mesh with the master tooth for indexing purposes and permitting the gear to be re-rolled into mesh with the master tooth.

3. In a gear testing machine, a master tooth, means for rolling the gear under test into and out of mesh with the master tooth, means for bodily moving the gear at least one tooth space on the pitch circle in the direction of rolling motion but without rotating the same when not in mesh with the master tooth for indexing purposes and permitting the gear to be re-rolled into mesh with the master tooth, and a support for the master tooth yieldable in the direction of rolling movement of the gear and adapted to be operated by imperfections in the spacing or profile of the teeth of the gear during said rolling movement.

4. In a gear testing machine, a rotary carrier for the gear to be tested having a coaxial cylinder of substantially the same diameter as the pitch diameter of the gear, a supporting track about and upon which the cylinder is adapted to be rolled for rotating the gear, and a master tooth supported in the path of movement of the gear teeth to mesh therewith as the gear is rolled along the track, said master tooth being yieldable in the direction of movement of the gear in case any inaccuracy in the spacing or profile of the gear teeth.

5. In a gear testing machine, a rotary carrier for the gear to be tested having a coaxial cylinder of substantially the same diameter as the pitch diameter of the gear, a track along and upon which the cylinder is adapted to be rolled, a master tooth supported in the path of movement of the gear teeth to mesh therewith as the cylinder is rolled along the track, and a track extension upon which the cylinder is adapted to roll when the gear is out of engagement with the master tooth, said extension with the gear carrier thereon being movable lengthwise of the track for indexing purposes.

6. In a gear testing machine, a rotary carrier for the gear to be tested having a coaxial cylinder of substantially the same diameter as the pitch diameter of the gear, a track along and upon which the cylinder is adapted to be rolled, a master tooth supported in the path of movement of the gear teeth to mesh therewith as the cylinder is rolled along the track, and a track extension upon which the cylinder is adapted to roll when the gear is out of engagement with the master tooth, and means for moving the extension a definite distance from a normal position lengthwise of the track.

7. In a gear testing machine, a rotary carrier for the gear to be tested having a coaxial cylinder of substantially the same diameter as the pitch diameter of the gear, a track along and upon which the cylinder is adapted to be rolled, a master tooth supported in the path of movement of the gear teeth to mesh therewith as the cylinder is rolled along the track, and a track extension upon which the cylinder is adapted to roll when the gear is out of engagement with the master tooth, and means for moving the extension from a normal position lengthwise of the track a distance corresponding to the space between the centers of the teeth of the gear on the pitch circle and permitting the carrier to be rerolled from the extension on to the track while the extension is shifted from its normal position for indexing purposes.

In witness whereof I have hereunto set my hand this 8th day of August, 1928.

CHARLES H. LOGUE.